R. C. QUIN.
FENDER FOR ROLLING STOCK.
APPLICATION FILED NOV. 28, 1908. RENEWED JULY 2, 1910.
966,596.
Patented Aug. 9, 1910.
2 SHEETS—SHEET 1.
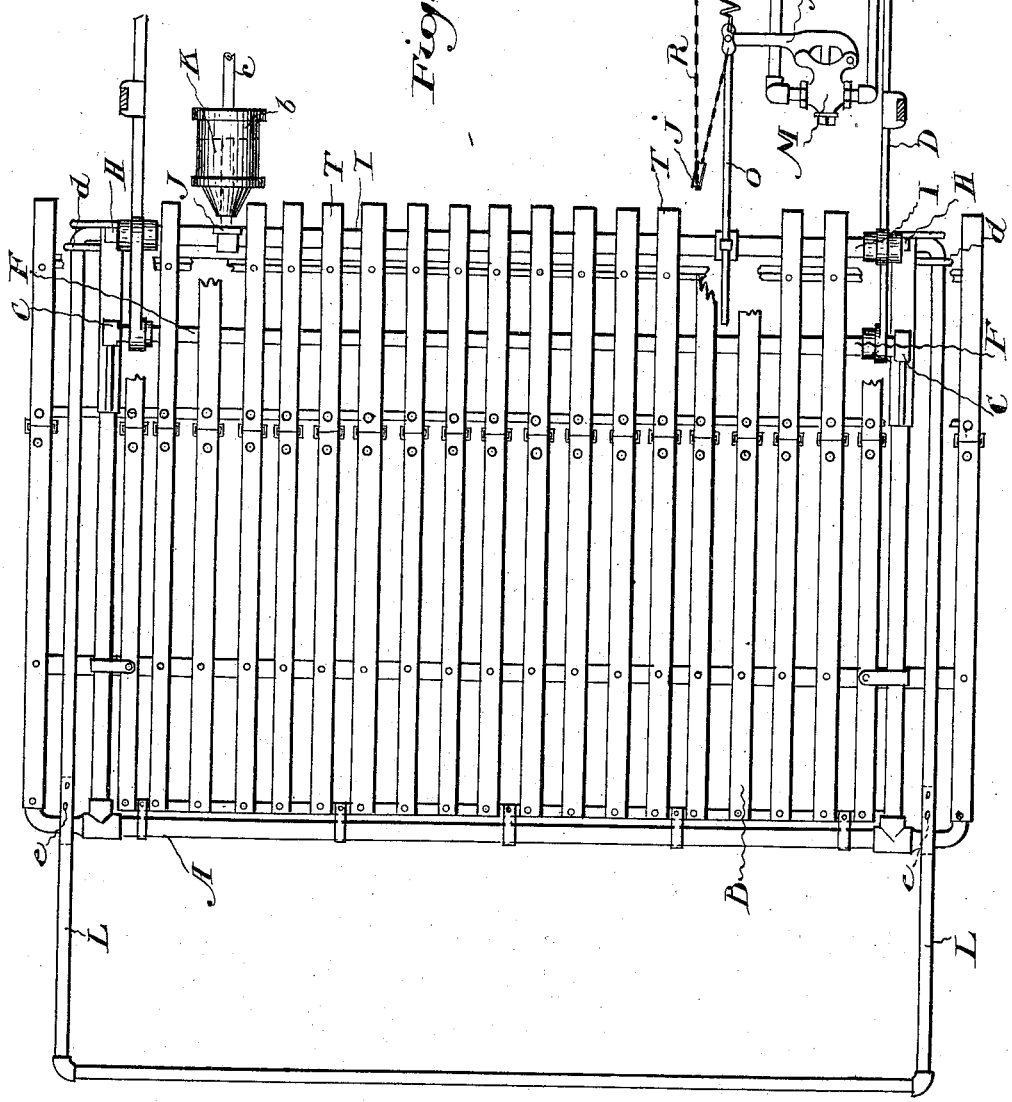
WITNESSES:
INVENTOR.
Richard C. Quin
BY
Ridout + Maybee
ATTORNEYS

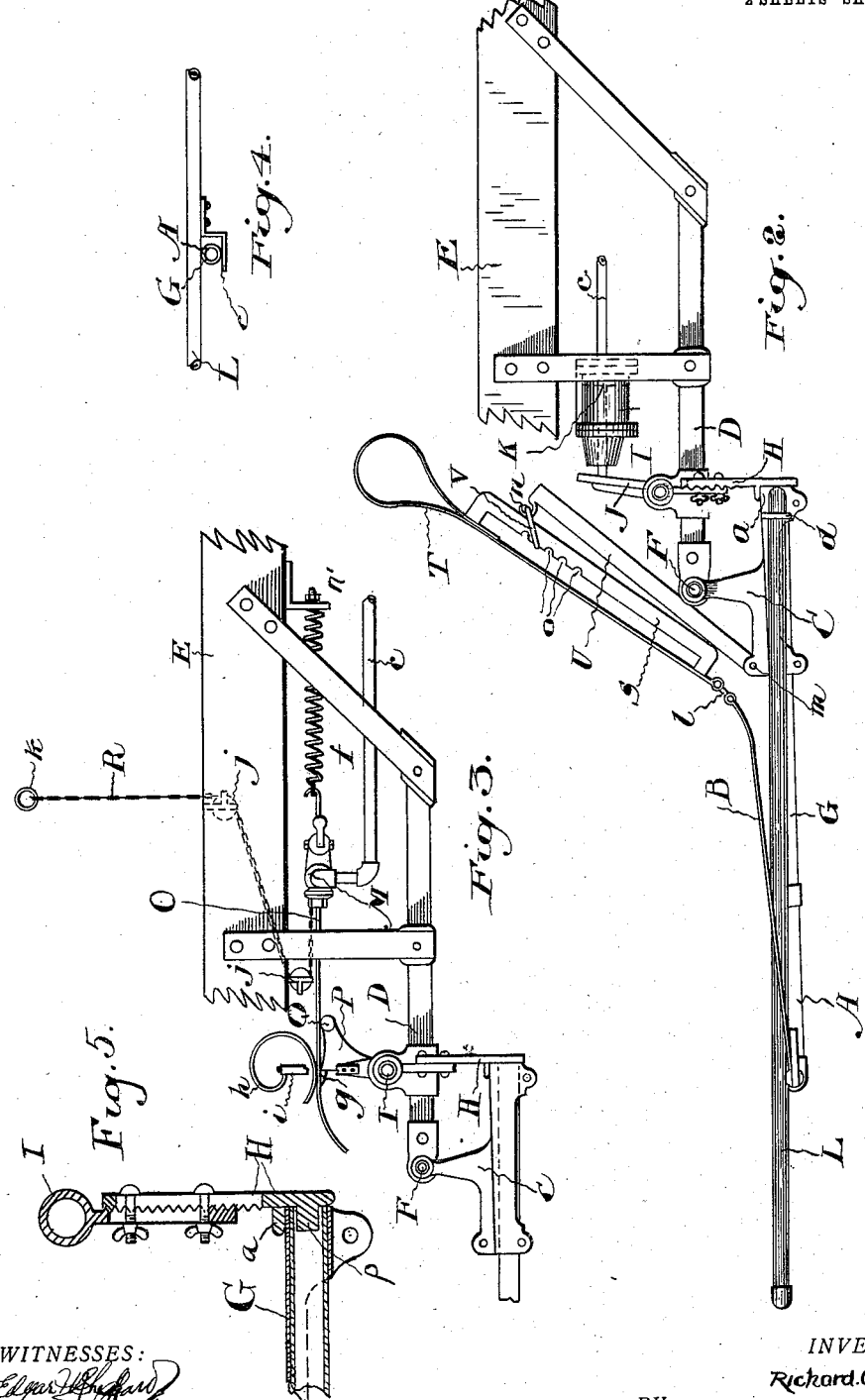

UNITED STATES PATENT OFFICE.

RICHARD C. QUIN, OF TORONTO, ONTARIO, CANADA.

FENDER FOR ROLLING-STOCK.

966,596.　　　　Specification of Letters Patent.　　Patented Aug. 9, 1910.

Application filed November 28, 1908, Serial No. 464,958. Renewed July 2, 1910. Serial No. 570,515.

*To all whom it may concern:*

Be it known that I, RICHARD C. QUIN, of the city of Toronto, Province of Ontario, Canada, have invented certain new and useful Improvements in Fenders for Rolling-Stock, of which the following is a specification.

This invention relates to fenders adapted to be connected to the front ends of electric or other city and suburban cars and my object is to devise a fender particularly adapted for use with cars equipped with the safety air-brake system described in my prior U. S. Patent No. 799,186, dated September 12th, 1905.

In that patent I described means whereby the operation of an emergency valve shut off the power, operated a sander and dropped the fender. This emergency valve was under the control of the motorman. In the present application I describe and claim means whereby the fender may be caused to drop by contact with an obstruction on the track and in dropping will operate the emergency valve so that when my present fender is employed an additional safeguard is provided, as any possible inattention or incapacity on the part of the motorman is guarded against.

My invention consists in the constructions hereinafter more specifically described and then definitely claimed.

Figure 1 is a plan view of a fender constructed in accordance with my invention. Fig. 2 is a side elevation of the same without the emergency air valve and the means for operating the same. Fig. 3 is a side elevation of part of the fender illustrating the emergency air valve and the means for operating the same. Fig. 4 is a detail showing one of the retaining hooks of the trigger frame. Fig. 5 is a detail view showing a modified form of the detent of the fender.

In the drawings like letters of reference indicate corresponding parts in the different figures.

The fender is formed in two parts, a substantially horizontal fender and the dash fender connected as hereinafter described. The horizontal fender comprises a frame A to which are connected at their forward portions a series of flexible slats B preferably of steel. The rearward ends of these slats are connected with the slats of the dash fender as hereinafter described. Toward the rear end of the horizontal fender two arms C are rigidly secured to the fender frame. These arms extend upwardly and are journaled on the fender support D rigidly secured at each side to the sills E of a car. The fender supports at each side are preferably connected by the round bar F, which preferably forms the pivots for the arms C. Parts G of the horizontal fender frame extend rearward of the pivots of the arm C. These extensions are engaged, when the fender is in the raised position shown, by the detents H which are provided with projections forming shoulders $a$ engaging the upper edges of the extension G. These detents are connected to a rock shaft I journaled on the fender supports D. This rock shaft also has secured thereon an arm J which extends in front of the piston $b$ of an air cylinder K. An air pipe $c$ leads to the cylinder. By supplying air to the cylinder through the pipe, the arm J may be rocked and the detents moved to release the fender and allow it to swing downward on the pivots of its arms C. The drop may also be accomplished automatically by the following mechanism.

The trigger frame L rests upon the fender frame A and is guided in the staples $d$. The rearward ends of the trigger frame are bent to engage the detents H. When the car is moving forward any obstruction on the track with which the trigger frame may engage causes the latter to release the detents and drop the fender. Lifting of the trigger frame at the moment of contact with an obstruction which might prevent its proper operation is prevented by means of the hooks $e$ secured to the side bars of the trigger frame and normally engaging the underside of the front bar of the fender frame (see Fig. 4). As the trigger frame is moved backward it disengages these hooks and may swing upwardly, if necessary, over the obstacle with which it has engaged. To enable the automatic dropping of the fender to operate an emergency air valve for the purpose set out in my prior patent hereinbefore referred to, I provide the following mechanism.

M is an air valve. This is controlled by the valve lever N. A coil spring $f$ connected with the lever and a stationary part $n'$ tends to open the valve. Normally the valve is held closed by a bar O, preferably flat as shown and thin enough to be springy, which extends forwardly and is provided with a shoulder g, which engages the forward edge of the upper end of an arm P secured to the rock shaft I. A lifter Q is formed as a rearward extension of the arm P and engages the underside of the bar O between the shoulder g and the valve M. When the rock shaft is rocked forwardly by the dropping of the fender, the lifter necessarily rises as it swings forward and disengages the shoulder g from the arm P, thus allowing the spring f to open the valve M. A bent spring h secured to the upper end of guides i embracing the bar O serves to prevent accidental displacement of the bar O.

As this fender is intended for use with an air brake system in which the operation of the emergency air valve causes the operation of a sander, it is desirable to provide means whereby the emergency air valve may be closed before the motorman has the opportunity of getting out on the track and raising his fender. For this purpose I provide a chain R, which is secured to the lever N, passes around the guide pulleys j and is provided with a ring k at its upper end. By means of this ring the motor man may, at any time, close the emergency air valve after it has been opened.

The dash fender hereinafter referred to is provided with a frame having side members S. The flexible slats T of the dash fender are secured to the frame and at their lower ends are connected by the pivoted links l with the rearward ends of the flexible slats B. The dash fender supports U are pivotedly connected with the frame of the horizontal fender at m, and normally are inclined rearwardly resting against a suitable stationary support. In the drawings the dash fender supports are shown as resting against the round bar F. Each of these supports has a link V pivotally connected with its upper end, preferably by engaging a hook n. Each link embraces one of the side members S and may be engaged with any one of a series of notches o. This permits of the dash fender being set at any desired elevation. The pivotal connections shown for the various parts of the fender render it possible to hinge up the horizontal fender against the front of the car. Also, if desired, the dash fender may be folded down flat on top of the horizontal fender.

This fender has proven very efficient under test, seldom, if ever, failing to pick up dummies of any kind that were placed on the track in any position, and it is found to drop quickly without requiring the use of springs. This quick drop is in part due to the pivoting of the fender at a point well above its surface, so that the front edge tends to rock rearwardly as well as downwardly, which enables the front edge of the fender to get to the track level before the forward movement of the car has brought its forward edge over the obstruction which has been encountered.

The automatic dropping and air valve operating mechanisms are thoroughly reliable and adapt the fender perfectly to the requirements of the air brake system of my prior patent hereinbefore referred to.

To prevent the front of the fender lifting over an obstruction on the track I provide each of the detents H with a projection p which fits within the bottom of the parts G of the fender frame. These projections do not, however, interfere with the dropping of the fender.

What I claim as my invention is:—

1. In a car the combination with an emergency air valve of a pivoted fender; a shaft; an arm on said shaft adapted to operate the emergency air valve; an arm on said shaft adapted to releasably hold the fender raised; a trigger frame carried by the fender adapted on contact with an obstruction to rock the shaft and thus release the fender and operate the emergency air valve, a third arm on said shaft; and air operated means for rocking said third arm to drop the fender.

2. In a car the combination with an emergency air valve of a spring tending to open the valve; releasable means for holding the valve closed; and a fender adapted on contact with an obstruction to operate said emergency valve.

3. In a car the combination with an emergency air valve of a spring tending to open the valve; a liftable bar adapted to hold it closed and having a shoulder formed thereon; a shaft; an arm on the shaft to engage the shoulder on the bar; a rearwardly extended lifter movable with said arm; and a fender adapted on contact with an obstruction to rock the aforesaid shaft to release the shouldered bar and allow the valve to be opened.

4. In a car the combination with an emergency air valve of a spring tending to open the valve; a liftable bar adapted to hold it closed and having a shoulder formed thereon; a shaft; an arm on the shaft adapted to engage the shoulder on the bar; a spring tending to hold the bar in contact with the arm; a rearwardly extended lifter movable with said arm; and a fender adapted on contact with an obstruction to rock the aforesaid shaft to release the shouldered bar and allow the valve to be opened.

5. The combination of a fender support; a substantially horizontal fender; arms extending up from said fender and pivotally connected to the support; an extension of the fender projecting rearwardly of the pivots; a rock shaft journaled on the fender support; a detent on said shaft adapted to engage the rearward extension; and a trigger frame carried by the fender and adapted on contact with an obstruction to release the detent.

6. The combination of a fender support; a fender comprising a substantially horizontal frame hinged on the support; flexible slats secured thereto at their forward ends; a dash fender frame having a hinged connection with the horizontal fender frame; longitudinal slats secured thereto; and hinged link connections between the lower ends of the dash fender slats and the rearward ends of the horizontal fender slats out of alinement with the hinges of the frames.

7. A car fender comprising a fender support; a horizontal fender carried thereby; dash fender supports hinged on the horizontal fender at their lower ends; a dash fender hinged on the upper ends of the supports; and means limiting the rearward swing of the dash fender supports.

8. A car fender comprising a horizontal fender; dash fender supports hinged thereon at their lower ends; a dash fender hinged on the upper ends of the supports by a link connection; and means limiting the rearward swing of the dash fender supports.

9. A car fender comprising a horizontal fender; dash fender supports hinged thereon at their lower ends; a dash fender having side frame members provided with a series of notches; links pivotally connected to the upper ends of the supports and each adapted to engage any one of the notches in the adjacent frame member; and means limiting the rearward swing of the dash fender supports.

10. The combination of a fender support; a substantially horizontal fender; arms extending up from said fender and pivotally connected to the support; an extension of the fender projecting rearwardly of the pivots; a rock shaft journaled on the fender support; and a detent on said shaft adapted to engage the rearward extension.

11. A car fender comprising a horizontal fender; dash fender supports carried thereon; a dash fender having side frame members provided with a series of notches and links pivotally connected to the upper ends of the supports and each adapted to engage any one of the notches in the adjacent frame member.

12. The combination of a fender support; a substantially horizontal fender; arms extending up from said fender and pivotally connected to the support; an extension of the fender projecting rearwardly of the pivots; a rock shaft journaled on the fender support; a detent on said shaft adapted to engage the rearward extension to prevent either upward or downward movement of the same; and means for releasing the detent.

Dated at Toronto, this 24th day of Nov. 1908.

RICHARD C. QUIN.

Signed in the presence of—
J. EDW. MAYBEE,
F. W. MCKENDRICK.